United States Patent [19]

Inatsuki

[11] Patent Number: 4,710,818

[45] Date of Patent: Dec. 1, 1987

[54] METHOD OF READING IMAGE DATA

[75] Inventor: Kenichi Inatsuki, Kanagawa, Japan

[73] Assignee: Fuji Photo Film Co., Ltd., Kanagawa, Japan

[21] Appl. No.: 890,243

[22] Filed: Jul. 28, 1986

[30] Foreign Application Priority Data

Aug. 8, 1985 [JP] Japan .................................. 60-174725

[51] Int. Cl.$^4$ ............................................... H04N 3/40
[52] U.S. Cl. .................................... 358/214; 358/215; 358/76
[58] Field of Search .......................... 358/76, 214, 215; 355/41, 40, 67, 68

[56] References Cited

U.S. PATENT DOCUMENTS 4,611,907  9/1986  Inatsuki ................................... 355/41
4,641,019  2/1987  Inatsuki ................................. 250/201
4,649,422  3/1987  Rauskolb ................................ 358/76

Primary Examiner—Michael A. Masinick
Attorney, Agent, or Firm—Sughrue, Mion, Zinn, Macpeak and Seas

[57] ABSTRACT

A method of sensing image data from a film fed by a pulse motor and associated components, whereby sensing is carried out at fixed intervals along the film, independently of whether the pulse motor is in an acceleration or deceleration period and without the use of a separate rotation sensor. Values are stored in advance representing constant feeding lengths of the film during periods of acceleration and deceleration. While the film is being transported during such periods, the stored values are read out in sequence and the sensor operated at time intervals defined by the stored values.

6 Claims, 4 Drawing Figures

FIG. 4

| Address (N) | Data |
|---|---|
| 0 | $Ka_1$ |
| 1 | $Ka_2$ |
| 2 | $Ka_3$ |
| ⋮ | ⋮ |
| n | 0 |

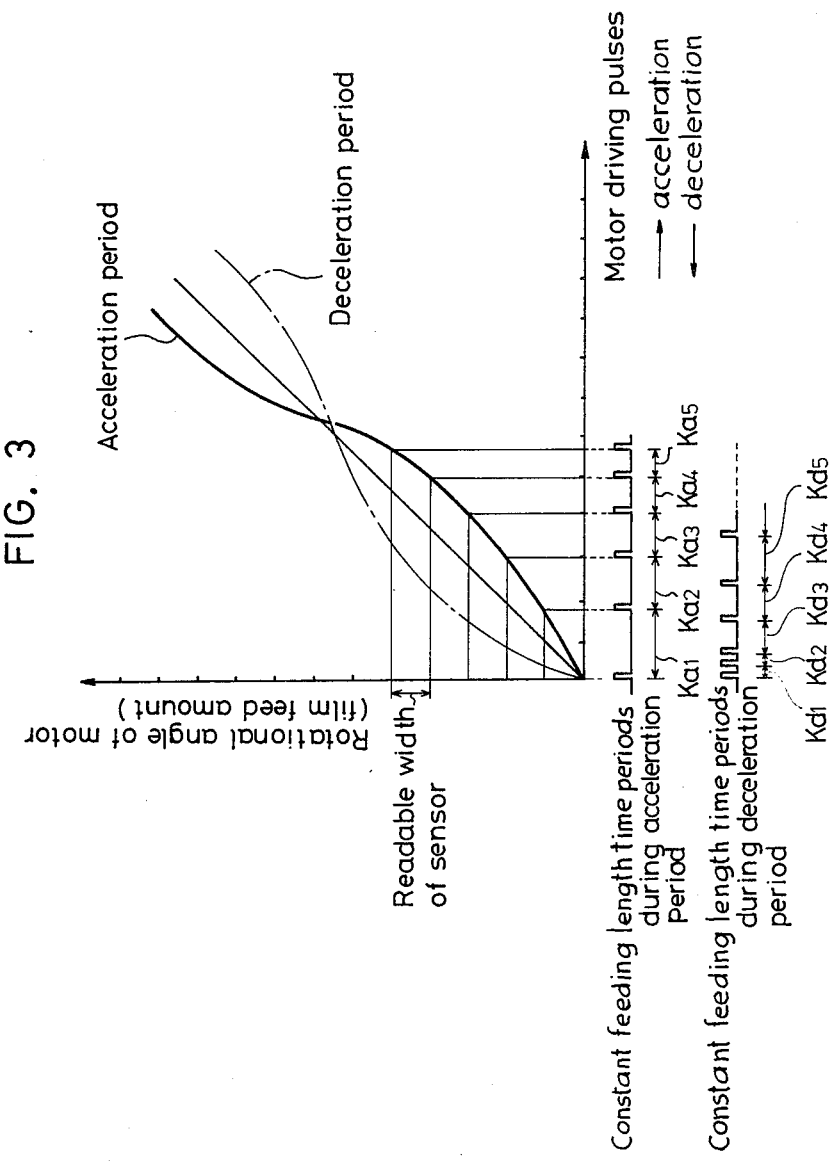

METHOD OF READING IMAGE DATA

BACKGROUND OF THE INVENTION

1. Field of the Invention

The present invention relates to a method of sensing image information recorded on a film while the film is being fed past a sensor.

2. Description of the Related Art

An image data reading apparatus is known in which, while a film is being fed using a pulse motor, the film density is detected, an edge of a frame in which an image has been recorded is judged from a change in the film density, and image data is then read by a photosensor every time the film is fed through a predetermined distance (e.g., the reading or sensing width of the photosensor). In such apparatus, a judgement is made as to whether or not the film has been fed through a predetermined distance by using driving timing pulses which are applied to the pulse motor. This method involves, however, the following problem. Namely, due to the inertia acting on the rotor of the pulse motor and a rotary member secured to the rotor, the angle of rotation of the pulse motor which corresponds to one pulse in the timing pulse train for driving the pulse motor is not a constant value that is, the angle through which the motor rotates changes for successive drive pulses when the motor is accelerating or decelerating. As a result, it is not possible to read image data at evenly spaced positions along the film during periods of acceleration and deceleration.

For this reason, to sense the image information with a photosensor every time the film is fed through a predetermined length, it is conventional practice to employ a pulse generator for separately detecting the angle of rotation of the pulse motor and to determine the times at which image data is sensed on the basis of the detected rotational angle.

This conventional method still suffers, however, from the disadvantage that the employment of the pulse generator complicates the arrangement of the apparatus and leads to an increase in costs.

SUMMARY OF THE INVENTION

In view of the above-described circumstances, it is a primary object of the present invention to provide, with a simplified arrangement, an image information sensing method which enables image information recorded on a film to be sensed by a photosensor every time the film is fed through a predetermined constant length.

To this end, the present invention provides a method of sensing image information wherein a film is fed by driving film feed means using a pulse motor, and image information from the film is read by a sensor, characterized in that, first, values are stored indicative of time periods corresponding to constant feeding lengths of the film during periods of acceleration and deceleration of the pulse motor, and, while the film is being fed past the sensor, operating the sensor at the time intervals defined by the values such that the sensor is operated at time intervals corresponding to constant feeding lengths of the film.

Accordingly, even when the pulse motor rotational angle and the actual film feeding length are not proportional to each other, for example, immediately after the pulse motor has been started (during the acceleration period) or immediately before the motor is stopped (during the deceleration period), it is possible to sense image information with accurate timing.

The above-described constant feeding length of the film is preferably made equal to the image sensing width of the sensor. In such case, the image information is read every time a time interval corresponding to a respective stored value elapses. It should however be noted that, if the constant feeding length is set such as to be smaller than the reading width of the sensor, it should be an integral fraction of the sensing width of the sensor, in which case the image information is sensed every time a period of time which is an integral multiple of the time interval represented by the respective stored value elapses.

As described above, it is possible, according to the present invention, to obtain the advantage that the image information can accurately be sensed, even during acceleration or deceleration periods, without the need to employ a separate pulse generator for detecting the feeding length of the film.

BRIEF DESCRIPTION OF THE DRAWINGS

FIG. 3 is a graph used to describe the operation of the control circuit shown in FIG. 1; and FIG. 4 shows an acceleration data table.

DESCRIPTION OF THE PREFERRED EMBODIMENT

One embodiment of the present invention will be described hereinunder with reference to the accompanying drawings.

Figure 1:
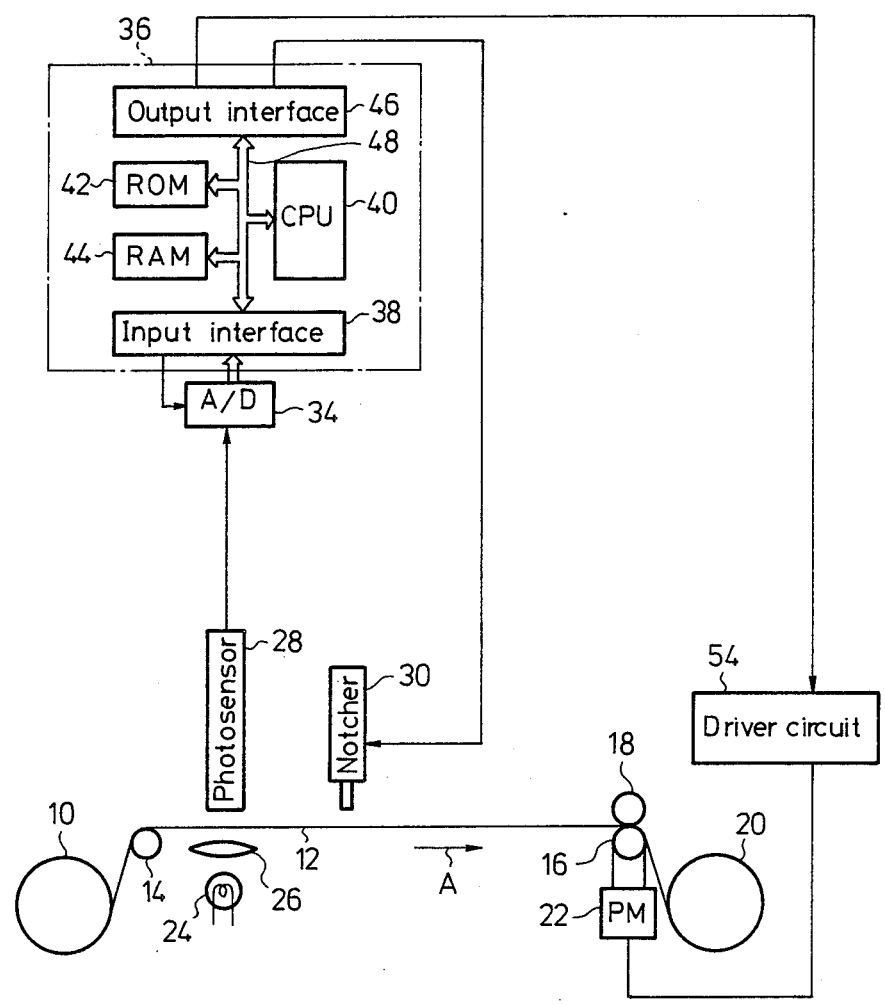
FIG. 1 shows a control circuit to which one embodiment of the present invention is applied.

Referring first to FIG. 1, a film 12 having negative or positive images recorded thereon is wound up on a reel 10. The film 12 is unwound from the reel 10 and wound up onto a reel 20 while being guided by a guide roller 14 and held between a drive roller 16 and a press roller 18. The drive roller 16 is rotated by a pulse motor 22. The reel 20 is subjected to a predetermined torque applied by a torque motor (not shown) in a direction in which the reel 20 winds up the film 12.

A light source 24 is disposed below (as viewed in FIG. 1) the film 12 stretching between the guide roller 14 and the drive roller 16. A lens 26 is disposed between the light source 24 and the film 12 in such a manner that the light from the light source 24 is passed through the lens 26 so as to become parallel rays which are then passed through the film 12. A photosensor 28 is disposed in opposing relation to the lens 26 across the film 12 so as to receive the light transmitted by the film 12 in order to detect the film density. This photosensor 28 is, for example, a one-dimensional image sensor which is disposed in such a manner that light-sensing elements thereof are arrayed in the direction of width of the film 12.

The output signal from the photosensor 28 is input to a microcomputer 36 through an A/D converter 34. The microcomputer 36 has an input interface 38, a CPU 40, a ROM 42, a RAM 44, an output interface 46 and a bus 48 which connects together these members. The microcomputer 36 reads the film density signal from the photosensor 28 every time the film 12 is fed through a distance corresponding to the sensing width of the light-sensing elements of the photosensor 28 in the longitudinal direction of the film 12, thereby making judgements to detect a frame edge of each frame image recorded on the film 12 and find frames which need not be printed, such as ones which have an out-of-focus image. A judging method which may be adopted for this purpose is disclosed in, for example, Japanese Patent Application No. 115254/1984 (Japanese Patent Laid-Open No. 60-257344).

A notcher 30 is disposed on the downstream side of the photosensor 28 with respect to the film transporting direction in such a manner as to face the film 12. The notcher 30 is adapted to form a notch in the film 12 for only frames which should be printed. The notcher 30 is controlled by the microcomputer 36.

The microcomputer 36 activates the pulse motor 22 through a driver circuit 54.

FIG. 3 shows the relationship between the pulses for driving the pulse motor 22 and the angle of rotation of the pulse motor 22 (film feeding length or distance). If there were no inertia acting on the rotor of the pulse motor 22 and the drive roller 16, the driving pulse period and the rotational angle would be proportional to each other, and the relationship therebetween would be represented by a straight line. However, the inertia acting on the rotor and the roller 16 causes the driving pulse period and the rotational angle not to be proportional to each other immediately after the pulse motor 22 has been started (during the acceleration period) and immediately before the motor 22 is stopped (during the deceleration period), as shown by the curves in FIG. 3. In the graph shown in FIG. 3, the solid line represents the relationship between the driving pulse period and the rotational angle during the acceleration period, and the one-dot chain line represents the relationship therebetween during the deceleration period.

Figure 4:
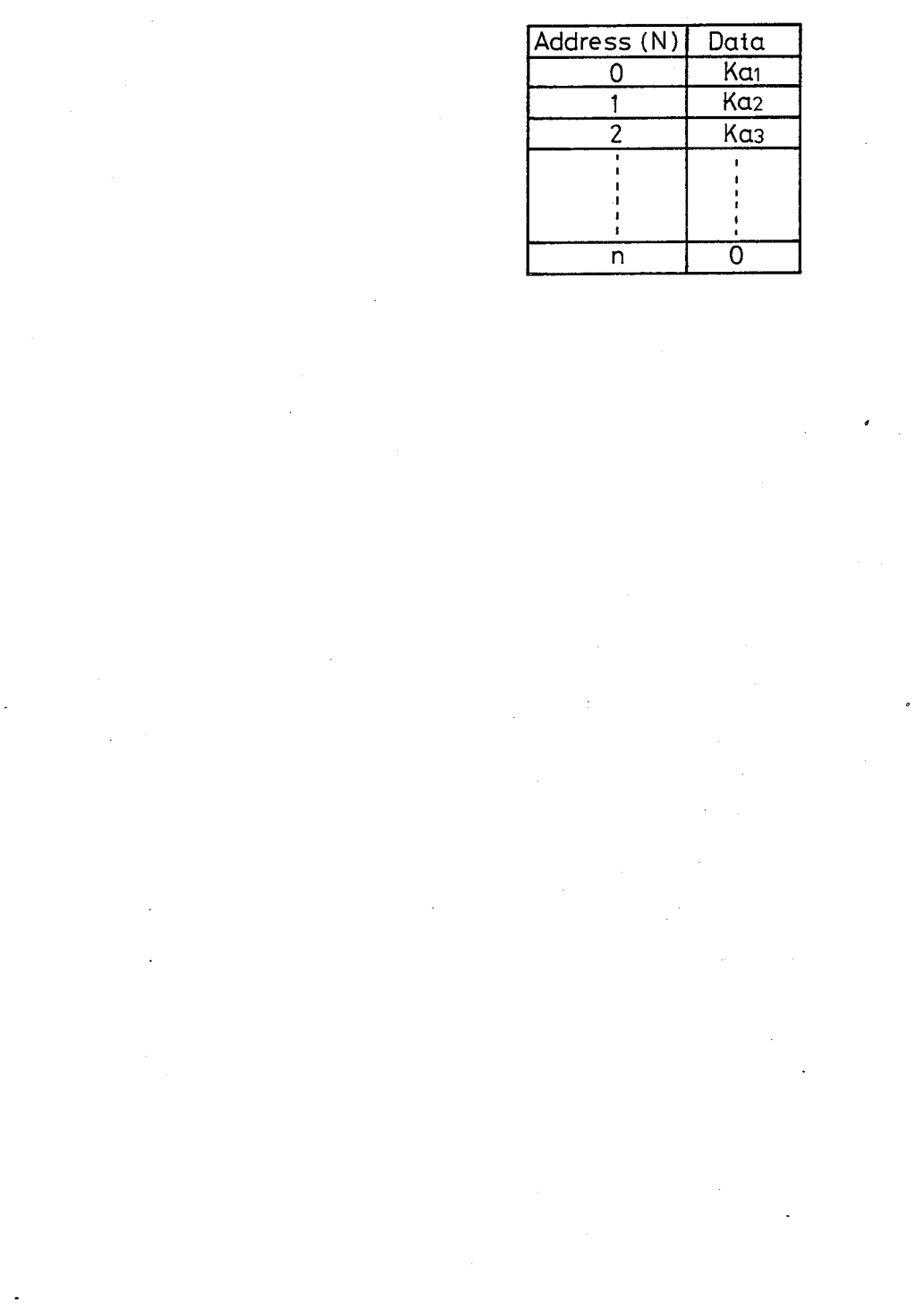

FIG. 3 also shows constant feeding length time periods during the acceleration period and the deceleration period. These are set such as to correspond to the sensing width of the photosensor 28, or to an integral fraction thereof. These periods are experimentally obtained in advance by actually feeding the film 12, and values reresenting the periods stored in the ROM 42 in the form of a table. The tables used during the acceleration and deceleration periods will hereinafter be referred to as the "acceleration data table" and the "deceleration data table", respectively. FIG. 4 shows the acceleration data table.

The time periods ($K_{a1}$, $K_{a2}$, $K_{a3}$ . . . ) representing a constant feeding length during the acceleration period gradually decrease in the early stage of the acceleration, whereas the periods ($K_{d1}$, $K_{d2}$, $K_{d3}$ . . . ) during the deceleration period gradually increase in the early stage of the deceleration.

Figure 2:
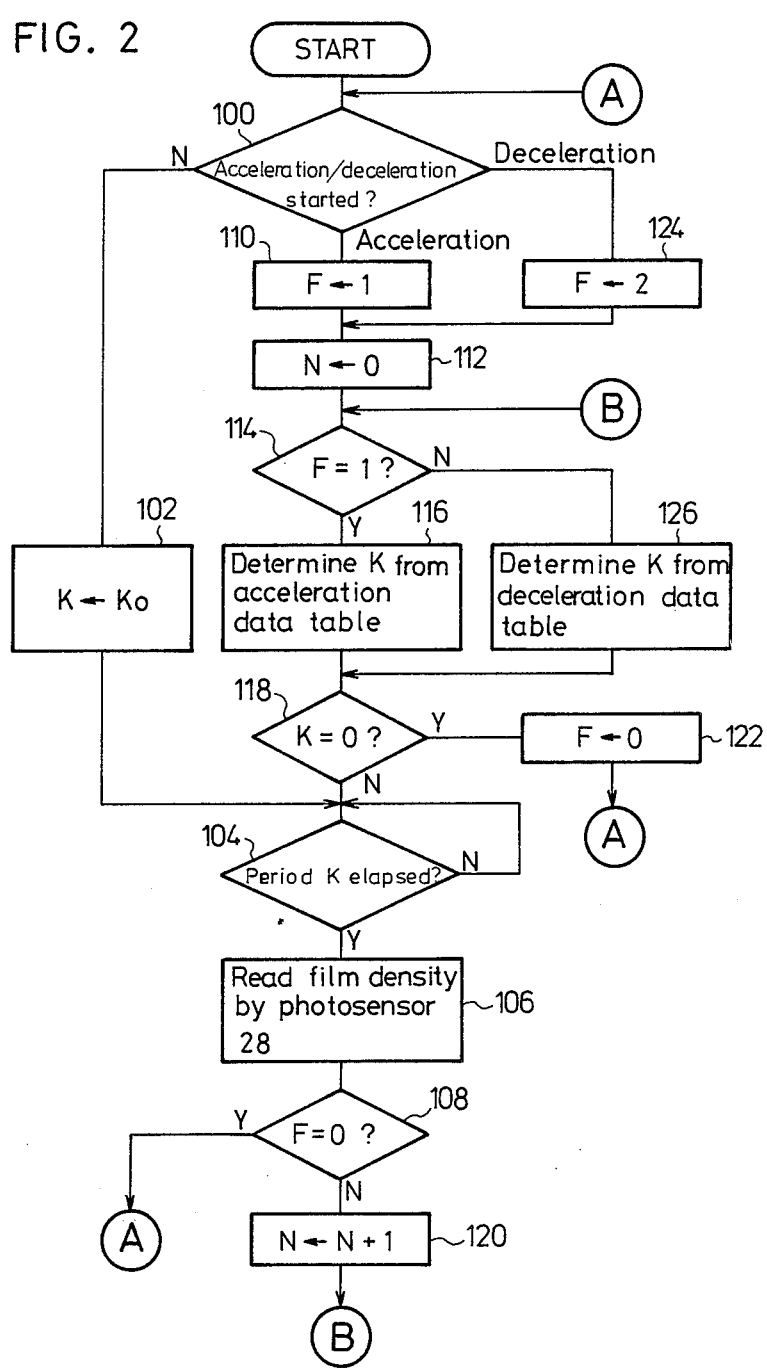
FIG. 2 is a control flow chart showing the operation of the microcomputer shown in FIG. 1.

The following is a description of the operation of this embodiment with reference to the flowchart shown in FIG. 2.

The operation conducted when the pulse motor 22 is being rotated at a uniform velocity will first be explained. Whether or not the pulse motor 22 is being rotated at a uniform velocity can be judged from the pulse motor speed command signal output from the microcomputer 36. In this case, the process proceeds from Step 100 to Step 102, in which $K_0$ is set as the value for the period K of the imaginary pulses. As the value for $K_0$, it is possible to employ the period of the driving pulses for driving the pulse motor 22. The process then proceeds to Step 104, in which a judgement is made as to whether or not a period of time which corresponds to the period K has elapsed. This judgement can be made by counting the number of clock pulses, or by counting the number of times of execution of Step 104 since the time for executing Step 104 is predetermined fixed interval. When the time corresponding to the period K has elapsed, this means that the film 12 has been fed through a predetermined distance (corresponding to the sensing width of the photosensor 28), and the process then proceeds to Step 106, in which the film density is read by the photosensor 28 and stored in the RAM 44. Since the value of a register F for discriminating between acceleration and deceleration has been initialized to 0 according to a main routine (not shown), the process proceeds from Step 108 to Step 100, and the above-described processing operation is repeated thereafter.

The film density data read in Step 106 is employed in another program, not shown, (e.g., that shown in the aforementioned Japanese Patent Application No. 115254/1984 (the Japanese Patent Application Laid-Open No. 60-257344)) for making judgement to detect frame edges and find out-of-focus images, and a notch is formed in the center of one lateral edge of only frames which should be printed by the notcher 30.

The following is a description of the operation carried out when an acceleration command is given to the pulse motor 22 to accelerate the rotational speed of the motor 22. When acceleration is started, the process proceeds from Step 100 to Step 110, in which 1 is set as the value of the register F in order to indicate the fact that the pulse motor 22 is in an accelerated state. This acceleration of the pulse motor 22 can be judged by means of software, since the pulse motor 22 is controlled by the CPU 40. Then, the process proceeds to Step 112, in which 0 is set as the value of the address N which indicates the table retrieval position. The process then proceeds through Step 114, and data $K_{a1}$ at the address N=0 in the acceleration data table shown in FIG. 4 is read and determined to be the value of K in Step 116. The value 0 is stored as an end mark at the last position in the table. The process then proceeds from Step 118 to Steps 104 and 106, and the processing operation similar to the above is executed. Then, the process proceeds to Step 108, and the value of the address N is incremented by 1 in Step 120. The process then returns to Step 114, and the above-described processing is repeated thereafter. When the value of K is 0 in Step 118, the value of the register F is initialized to 0 in Step 122, and the process then returns to Step 100.

In consequence, image data is read every time the a successive period $K_{a1}$, $K_{a2}$, $K_{a3}$ . . . from the start of acceleration, whereby it is possible to read the film density by the photosensor 28 every time the film 12 is fed through a predetermined constant distance without the need to employ a pulse generator, even during the acceleration period.

The operation conducted during the deceleration period will be explained below.

In this case, the process proceeds from Step 100 to Step 124, in which 2 is set as the value of the register F in order to indicate the fact that the pulse motor 22 is in a decelerated state. Then, the process proceeds through Steps 112 and 114, and the value of $K(=K_{d1}, K_{d2}, K_{d3}, \ldots, 0)$ is determined from the deceleration data table in Step 126. In the other respects, the operation carried out during the deceleration period is similar to that in the case of acceleration.

In this way, every time a period of time $K_{d1}$, $K_{d2}$, $K_{d3}$ . . . elapses after the start of deceleration, image information is sensed read. Thus, during the deceleration period also, it is possible to read the film density with the photosensor 28 every time the film 12 is fed through a predetermined constant distance in a manner similar to that in the case of acceleration.

What is claimed is:

1. A method of sensing image information wherein a film is fed by film driving feed means including a pulse motor, and image information from the film is sensed by a sensor, comprising the steps of:
   storing values indicative of time periods corresponding to constant feeding lengths of said film during periods of acceleration and deceleration of said pulse motor; and
   operating said sensor during feeding of said film by said pulse motor at time intervals defined by said values, wherein said sensor is operated at intervals corresponding to constant feeding lengths of said film.

2. The method of sensing image information of claim 1, wherein said constant feeding lengths of said film each are equal to a sensing width of said sensor.

3. The method of sensing image information of claim 1, wherein said constant feeding lengths of said film are equal to an integral fraction of a sensing width of said sensor.

4. The method of sensing image information of claim 1, wherein, in said step of storing said values, said values corresponding to constant feeding lengths of said film during periods of acceleration and deceleration are respectively stored in sequence from the start of acceleration and deceleration of said pulse motor.

5. The method of sensing image information of claim 4, wherein said step of operating said sensor comprises:
   determining when said pulse motor commences a period of acceleration;
   reading in sequence said values indicative of time periods corresponding to constant feeding lengths of said film during periods of acceleration; and
   for each value read, operating said sensor when an interval of time corresponding to the value read has elapsed.

6. The method of sensing image information of claim 5, wherein said step of operating said sensor comprises:
   determining when said pulse motor commences a period of deceleration;
   reading in sequence said values indicative of time periods corresponding to constant feeding lengths of said film during periods of deceleration; and
   for each value read, operating said sensor when an interval of time corresponding to the value read has elapsed.

* * * * *